United States Patent [19]

Pedersen

[11] 3,773,980

[45] Nov. 20, 1973

[54] BILATERAL SWITCHING ARRAY WITH CROSSPOINT STORAGE

[75] Inventor: Thomas Josep Pedersen, Lincroft, N.J.

[73] Assignee: Bell Telephone Laboratories, Incorporated, Murray Hill, N.J.

[22] Filed: Apr. 13, 1972

[21] Appl. No.: 243,640

[52] U.S. Cl. ........................... 179/15 AQ, 179/15 A

[51] Int. Cl. ............................................... H04j 3/16

[58] Field of Search .................. 179/15 AL, 15 AQ, 179/15 A

[56] References Cited

UNITED STATES PATENTS

| | | | |
|---|---|---|---|
| 3,674,938 | 7/1972 | Jacob | 179/15 AQ |
| 3,705,266 | 12/1972 | Philip | 179/15 AQ |

*Primary Examiner*—Ralph D. Blakeslee
*Attorney*—W. L. Keefauver

[57] ABSTRACT

An improved switching array of the type having data storage elements connected at the crosspoints is provided. The switching array has two sets of input highways and two sets of output highways. Both connections required for each two-way communication on these highways are established at one of the bilateral data storage elements. Advantage is taken of spatial and temporal symmetries in the connection paths to achieve this result. Favorable hardware economy in each data storage element is achieved through interchange of the roles of component shift registers between providing one of the connections required for a two-way communication and, alternately, the other such connection.

11 Claims, 10 Drawing Figures

FIG. 8

| | $\alpha$ TRUE | $\beta$ TRUE |
|---|---|---|
| RSR 410 | | |
| FUNCTION | RECEIVES BITS FROM LINE 452<br>TRANSMITS BITS TO LINE 453 | RECEIVES BITS FROM LINE 450<br>TRANSMITS BITS TO LINE 451 |
| CLK | START ∩ CLOCK ∩ UDC 420 NOT '0' | TRANSACT ∩ CLOCK |
| SHIFT DIRECTION | RIGHT | LEFT |
| RSR 460 | | |
| FUNCTION | RECEIVES BITS FROM LINE 450<br>TRANSMITS BITS TO LINE 451 | RECEIVES BITS FROM LINE 452<br>TRANSMITS BITS TO LINE 453 |
| CLK | TRANSACT ∩ CLOCK | START ∩ CLOCK ∩ UDC 470 NOT '0' |
| SHIFT DIRECTION | LEFT | RIGHT |
| UDC 420 | | |
| CLK | START ∩ CLOCK | TRANSACT ∩ CLOCK |
| COUNT DIRECTION | DOWN | UP |
| UDC 470 | | |
| CLK | TRANSACT ∩ CLOCK | START ∩ CLOCK |
| COUNT DIRECTION | UP | DOWN |

BILATERAL SWITCHING ARRAY WITH CROSSPOINT STORAGE

BACKGROUND OF THE INVENTION

This invention relates to time division multiplex communication systems. It relates more particularly to time division switching systems employing time slot interchange devices.

The most common current practice in communication systems generally is to establish a solid connection between a calling line and a called line via a path which is associated individually and uninterruptedly with the connection for the duration of the call. Thus a quantity of equipment, dependent upon the number of lines served and the expected frequency of service, is provided in a common pool from which portions may be chosen and assigned to a particular call. Such an arrangement is referred to as "space division" in which the privacy of each conversation is assured by the division or separation of individual conversations in space.

In contrast, communication systems have been developed which operate on a time division basis in which a number of conversations share a single spatial communication highway. Privacy of conversation is assured in such systems by the division or separation of individual conversations in time. Thus each conversation is assigned to the common spatial highway for an extremely short, periodically recurring interval, called a time slot, and the connection between any two lines in communication is completed only during the assigned interval or time slot. Samples which retain essential characteristics of the voice or other signal are transmitted over the common highway in these time slots and are utilized in the called line to reconstruct the original signal.

A critical problem is presented in both space and time division systems when one or more stages of switching are interposed between the calling and called lines. This problem is termed "blocking" and arises when a portion of the switched path is not available for assignment to a potential connection.

Space division networks minimize the blocking problem primarily through redundancy of available network paths which, of course, is expensive. Time division networks treat the problem by interchanging the time slots assigned to particular call connections in various stages of the network. This is accomplished by incorporating delay in the common highways of intermediate the switching elements. Thus a conversation transmitted in one time slot on a first highway may be shifted to different time slots in successive highways to which it is switched enroute to its destination. The provision of a capability for rearranging the time slots on which a given conversation is transmitted allows a significant reduction in the blocking probability as compared to a system of equal spatial cross-section without such a capability. Collectively, the techniques for providing such a capability have come to be known as time slot interchanging.

In general, time slot interchanging has been accomplished by selectively introducing delay in the path of signals arriving in given time slots so that upon exiting the switching system they appear in different time slots. Such techniques are described, for example, in U. S. Pat. Nos. 3,172,956 and 3,446,917 issued to H. Inose et al. on Mar. 9, 1965 and Mar. 27, 1969, respectively, and in H. Inose et al., "A Time Slot Interchange System in Time-Division Electronic Exchanges," IEEE Trans., Vol. CS-11, p. 336 (September, 1963); C. Y. Lee, "Analysis of Switching Networks," *Bell System Technical Journal*, Vol. 34, p. 1,287 (November, 1955); and U.S. Pat. No. 3,573,381 issued to M. J. Marcus on Apr. 6, 1971.

In time division communication systems of the prior art, common practice has been to perform the switching function in time-shared space division networks. For example, switching may be performed in arrays wherein input lines comprise one set of conductors (horizontal or vertical) and output lines comprise the other set of conductors. In a common configuration, gates are connected as crosspoints in the arrays and are selectively enabled in each time slot. The result is to establish an array having, in each time slot, a connection between each input line and an output line. The spatial configuration of the array varies from time slot to time slot as different combinations of crosspoints are enabled.

More recently, time division communication systems have been described which utilize switching capabilities provided by arrays with data storage devices connected at the crosspoints. These storage devices allow a call entering the switching array in one time slot to leave the array in another time slot. This approach to implementation of the switching function allows added flexibility in network design. In particular, for a switching array of a given size, the probability of there being no available path through the switching network for a potential call (blocking probability) is minimized, since the time slots may be reordered to accommodate inavailability of a common time slot in given input and output conductors. A crosspoint storage switching array of this type is described in detail in U.S. Pat. No. 3,573,381, issued to M. J. Marcus on Apr. 6, 1971.

It is an object of the present invention to provide an improved switching array of the type having data storage devices connected at the crosspoints. In particular, an array having two sets of input highways and two sets of output highways is provided, whereby both connections required for a two-way communication can be established. Advantage is taken of spatial and temporal symmetries in the connection path to achieve this result. Since both connections are established in a single array, a reduction in hardware over the prior art is achieved.

It is another object of the invention to provide a switching system wherein a common local control is used efficiently to establish both of the two connections required at each stage of switching for two-way communication.

It is still another object of the invention to provide a switching network wherein a single bilateral crosspoint store in each switching stage accommodates both connections for a two-way communication.

It is yet another object of this invention to provide a bilateral crosspoint store suitable for use in the bilateral crosspoint switching arrays herein described. Such a bilateral crosspoint store is designed to achieve hardware economy through the interchange of roles of the components therein being provided one of the two connections required for each two-way communication and the other such connection.

SUMMARY OF THE INVENTION.

These and other objects are achieved in accordance with one embodiment of the present invention by connecting bilateral crosspoint stores in a switching array having two sets of input highways and two sets of output highways. Each store is connected to two input highways and two output highways. Typically such a switching array is connected as an element of a multistage switching network connected between line units which provide connection to subscriber lines, on one side of the switching network, and a plurality of time slot interchanger devices, on the other side of the network. Typically, each row in such a switching array may contain one input and one output highway on the side of the array designed to be nearest the line unit highways. Each column in the array may then contain one input and one output highway which is adapted to provide connections to the time slot interchanger side of the system.

A two-way communication between two subscribers is established in such a network by providing a first connection path whereby signals in the time slot assigned to a first subscriber are routed from the line unit corresponding to that subscriber to an input highway on the line unit highway side of the network through switching arrays in successive stages of the network. In accordance with the general nature of switching networks with crosspoint storage, the time slot in which the aforementioned signals occur may differ from one stage to the next. When the signals reach an output highway on the time slot interchanger side of the network, they are routed through a time slot interchanger providing a general time slot interchange capability, and then to an input highway on the time slot interchanger side of the network. The signals are then transmitted through the stages of the switching network in reverse order along a spatial path chosen to direct the signal to the output highway which is connected to the line unit corresponding to the second subscriber.

The second connection necessary for the two-way communication begins at the line unit belonging to the second subscriber. Signals in the time slot assigned to the second subscriber are routed to an input highway on the line unit highway side of the network. This input highway is row-wise paired with the aforementioned output highway connected to the second subscriber's line unit. The signals are routed in the opposite direction along the same spatial path heretofore described for the transmission of signals originating with the first subscriber, thus taking advantage of symmetry in the two required connection paths. The time slot interchanges which take place from stage to stage in this second connection path are complementary to those of the first connection path. Although a separate time slot interchanger may be used in the second connection path to connect the output and input highways on the time slot interchanger side of the network, a bilateral time slot interchanger of the type described in my copending application, Ser. No. 214,144, filed Dec. 20, 1971, may advantageously be used to provide both required connections.

In each switching array in the network, input and output interactions on the line unit highway side input and output highways proceed bit by bit under the control of a local memory which selects, in each time slot, one bilateral store in each row to receive an input bit and to direct an output bit to the line unit highway side input and output highways, respectively, associated with that row. Input and output interactions with the input and output highways on the time slot interchanger side of the array do not proceed bit by bit under the direction of the local control, but rather proceed from one crosspoint store to the next, down each column in the array. In each time division multiplex signal frame, each store in a column completes its receiving and transmitting interaction with the input and output highways associated with that row before the next store in that column begins its input and output interactions.

Each bilateral crosspoint store typically contains two reversible shaft registers which receive and transmit bits in each frame. The roles of the two shift registers are reversed in alternate frames, and their connections to the input and output highways altered so that data received from a time slot interchanger side input highway in one frame is transmitted to a line unit highway side output highway in the next frame and so that data received from a line unit highway side input highway in one frame is transmitted to a time slot interchanger side output highway in the next frame. An up-down counter is provided in connection with each shift register to keep certain counts of the number of bits stored in that register. Gating circuitry is provided to interconnect the shift registers appropriately to the input and output highways and to provide appropriate clock pulses for the shift registers and counters.

The present invention can best be understood with reference to the accompanying drawing as briefly described below and to the detailed description which follows.

BRIEF DESCRIPTION OF THE DRAWING

FIG. 8 is a chart detailing the roles performed by certain of the components of the store of FIG. 7.

DETAILED DESCRIPTION

Figure 1A:
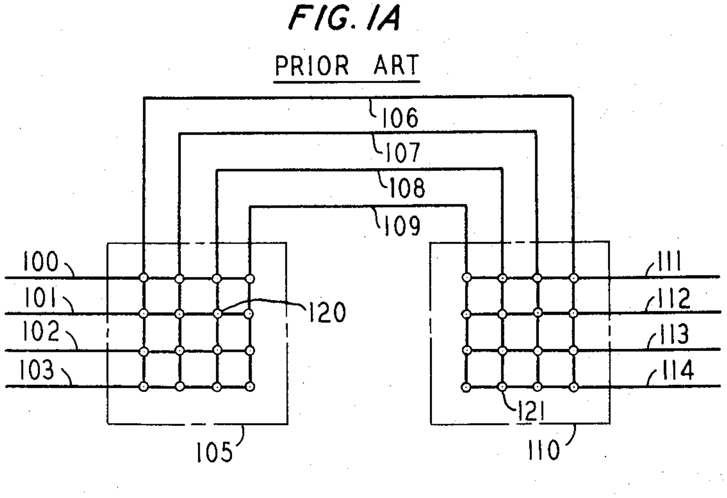
FIG. 1A PRIOR ART
FIGS. 1A, 1B, and 1C illustrate time division multiplex switching systems of the prior art.
Figure 1B:
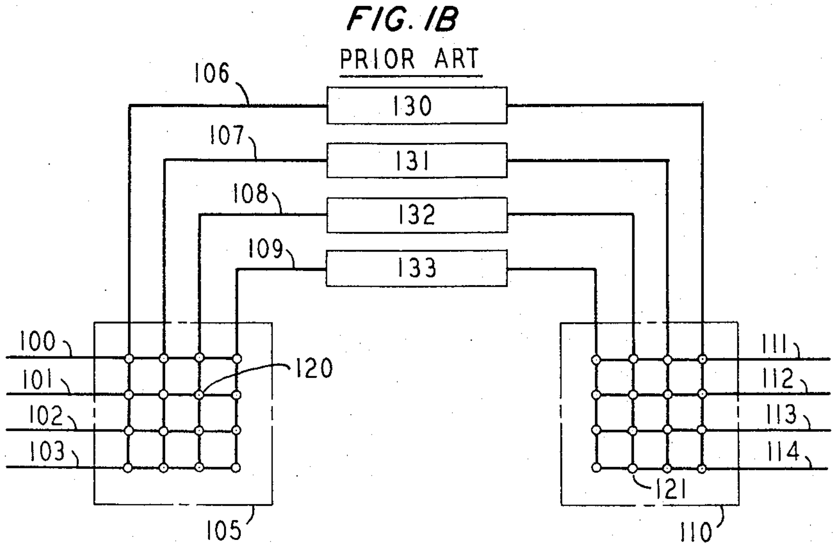
FIG. 1B PRIOR ART
Figure 1C:
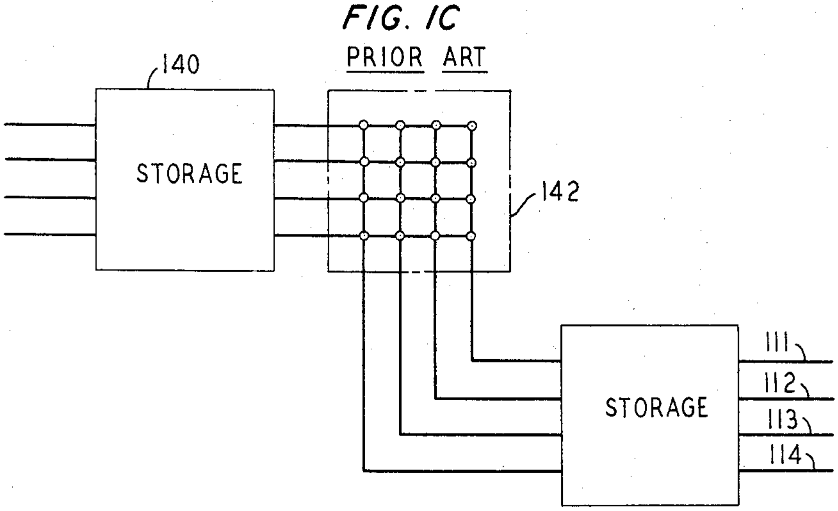
FIG. 1C PRIOR ART

As illustrated in FIGS. 1A–1C, three prior art arrangements are available for switching time division multiplex information through a network. The FIG. 1A arrangement is disclosed, for example, in D. B. James et al. U. S. Pat. No. 2,957,949, issued Oct. 25, 1960, while the arrangements of FIGS. 1B and 1C are disclosed, for example, in H. Inose et al. application Ser. No. 461,791 filed June 7, 1965, now U. S. Pat. No. 3,446,917, issued May 17, 1969. Initially time divided information in coded form was switched through time division gates in the manner shown in FIG. 1A. Thus input highways 100–103 each may contain a plurality of distinct messages in time multiplexed channels which are directed to time channels in output highways 111–114 via switching stages 105 and 110 and interstage highways 106–109. In this arrangement a message may be switched from any input highway to any output highway, but it must be retained in the same time channel through the network to preserve system synchronism. For example a message arriving on highway 101 in time channel A may be switched to highway 114 so long as it remains in channel A. This may be accomplished, for example, by enabling time division gates 120 and 121 simultaneously during time channel A, the message then being transferred via junctor 108.

The major disadvantage inherent in this approach is evident from consideration of the possibility, in the previous example, of time channel A being occupied with other messages in succeeding stages of the network reached through outgoing highways 111–114. Such a condition, of course, prevents completion of the connection involving a message in time channel A of highwat 101, and it is said that the call is blocked. Such blockage may occur despite the fact that some channels in the outgoing trunks are available for assignment, thus presenting a difficult traffic-handling problem.

Prior art solutions to this blocking problem are illustrated in FIGS. 1B and 1C. A delay device, included in each transmission path through a switching stage permits an interchange of time channels thereby facilitating the completion of a call connection through this stage so long as any time channel is available in each highway forming the transmission path. FIG. 1B employs the same basic approach as that shown in FIG. 1A except that storage has been introduced into the intermediate highways. Thus an input time channel is switched onto an intermediate highway in its original time channel as before, but the delay encountered in the corresponding one of devices 130–133 permits it to leave the intermediate highway in a different time channel. Thus in the example used to illustrate the FIG. 1A operation, if channel A is occupied on highway 114, a message arriving on highway 101 in channel A still may be switched via highway 108, through crosspoints 120 and 121, simply by delaying the message in device 132, FIG. 1B, so as to appear in previously idle channel B on highway 114.

FIG. 1C depicts another prior art approach in which time channel interchange is employed. In this instance the signal transmission rate within the network may be different from that on the highways. Thus message signals are delayed in storage apparatus 140 and 141 until time channels are available through the switch matrix 142 and on the output highways 111–114 respectively.

Figure 2:
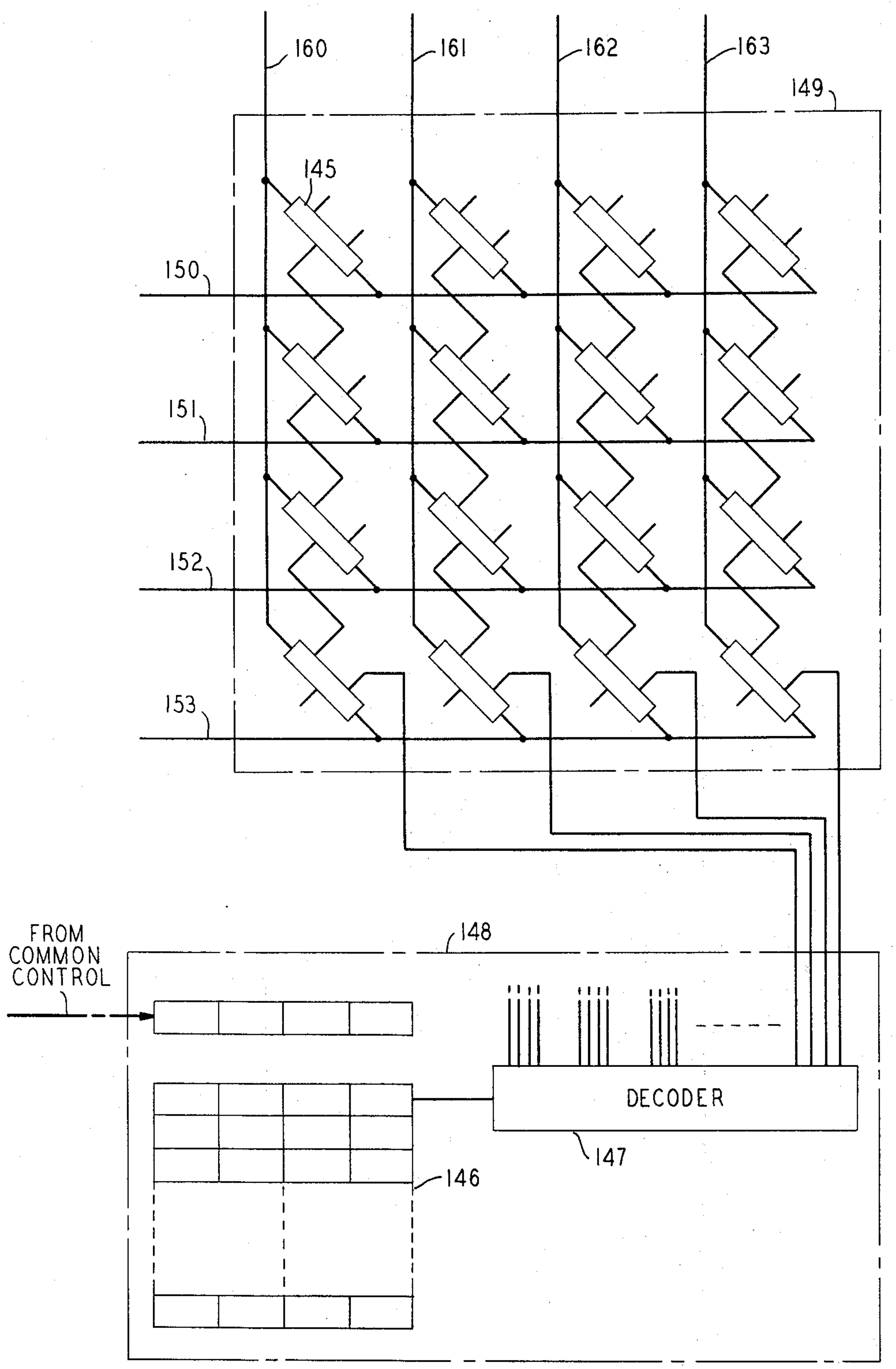
FIG. 2 PRIOR ART
FIG. 2 illustrates a time division multiplex switching array of prior art design which uses crosspoint storage elements to provide spatial and temporal switching between the input and output highways.

FIG. 2 illustrates a prior art arrangement which differs considerably from those of FIGS. 1A–1C. This arrangement is closed in U. S. Pat. No. 3,573,381 issued to M. J. Marcus on Apr. 6, 1971. The arrangement of FIG. 2 is distinguished from other prior art switching networks primarily in that both the delay and the switching operations are performed by the same elements. FIG. 2 contains a 4 × 4 matrix 149 of such elements 145, known as crosspoint stores, which stores are controlled by local control 148 including memory 146 and decoder 147. Input highways 150 through 153 have access to output highways 160 through 163 via the crosspoint stores.

Each crosspoint store 145 has two storage registers, which provide it with the capacity to store message signals from input highways 150 through 153 in each frame and also to transmit in each frame on output highways 160 through 163 those message signals which were stored in the previous frame. Thus in each message time slot, one crosspoint store in each row is enabled to store the message signal present on its corresponding input highway in that time channel. Simultaneously, the message signals stored during the previous frame are dumped onto the output highways. The signals stored in the stores of the uppermost row of each column are dumped first. When each store has completed dumping its stored signals, it signals the crosspoint store immediately below in its column to initiate the dumping of signals from the latter store. The signals in each store are applied to the corresponding output highway in a reverse sequence from the sequence in which they were received on the corresponding input highway.

It is easily seen that the arrangement of FIG. 2 provides a time slot rearrangement capability, since a message signal stored in one time slot in a crosspoint store in one frame may be transmitted on a different time slot in the subsequent frame. This time slot rearrangement capability makes it possible to accommodate two message signals arriving on different input highways in the same time slot desiring to reach a common output highway. This is accomplished by storing the message signals in the respective crosspoint stores corresponding to the different input highways and the common output highway. The signals are transmitted on the common output highway on different time slots in the subsequent frame.

Figure 3:
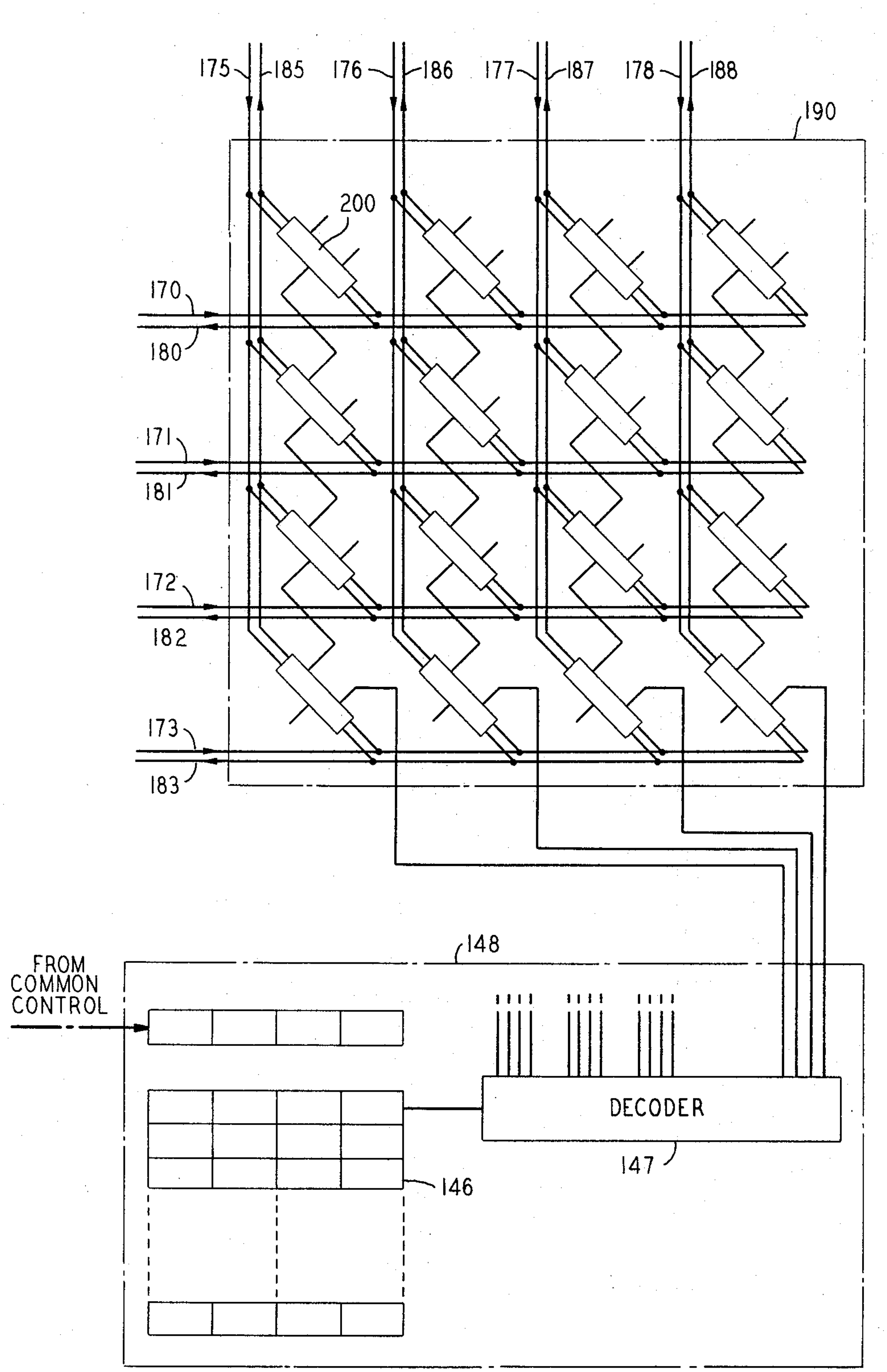
FIG. 3 illustrates a time division switching array constructed in accordance with the teachings of this invention.

FIG. 3 illustrates a bilateral switch constructed according to the teachings of the present invention. It is to be noted that the switch matrix 190 of FIG. 3 differs from that of FIG. 2 in that two sets of array conductors are included. Along the left edge of the matrix are found not only input highways 170 through 173 but also output highways 180 through 183. Along the upper edge of the matrix are found not only output highways 185 through 188 but also input highways 175 through 178. Prior art crosspoint stores are replaced with bilateral crosspoint stores 200. The construction and manner of operation of these bilateral stores are described below with reference to FIG. 7. These bilateral crosspoint stores differ from the crosspoint stores 145 of the prior art matrix of FIG. 2 in that each is adapted to be connected to two input highways and to two output highways. A local control 148 functions in the same manner as in the prior art matrix of FIG. 2 during static operation.

Input highways 170 through 173 and output highways 185 through 188 correspond, respectively, to input highways 150 through 153 and output highways 160 through 163 of the prior art matrix of FIG. 2. Matrix 190 of FIG. 3 provides exactly the same switching and time slot rearrangement capabilities between message signals received on input highways 170 through 173 and transmitted on output highways 185 through 188 as does the prior art matrix of FIG. 2. The system shown in FIG. 3 is distinguished from the prior art arrangement shown in FIG. 2 by the inclusion of a second set of input and output highways. The provision of this second set of input and output highways, together with the replacement of prior art crosspoint stores with bilateral crosspoint stores 200, results in a matrix which is equipped to provide switching and time slot rearrangement for both connections in a two-way communication. The first connection is routed through the matrix via one of input highways 170 through 173 and one of output highways 185 through 188. The second connection is routed through the matrix via one of input highways 175 through 178 and one of output highways 180 through 183. Symmetry in the topology of the most efficient connection paths makes it possible to use common bilateral crosspoint stores 200 and a common local control 148 for both connections.

BASIC SYMMETRY PROPERTIES

The present invention is directed primarily to a bilateral switching matrix suitable for inclusion in a bilateral switching network. The interconnection of individual switching matrices in stages and levels to form the overall network may be carried out by standard methods known in the prior art, and will not be discussed in detail here. Likewise, the integration of a bilateral switching network into an overall switching system, including time slot interchangers and line interface equipment is straightforward and not the subject of this application. In fact, required design constraints on the bilateral switching matrix are specified only by the required space and time relationships of signals on its input and output highways, and matrices so designed may have application to a more generalized class of switching systems than the particular type discussed here for contextual purposes.

Nevertheless some discussion of a complete switching system is useful to provide motivation for the use of the particular space and time relationships imposed on the input and output highways of the bilateral switching matrix of the present invention. These relationships are related primarily to symmetry properties.

Figure 4:
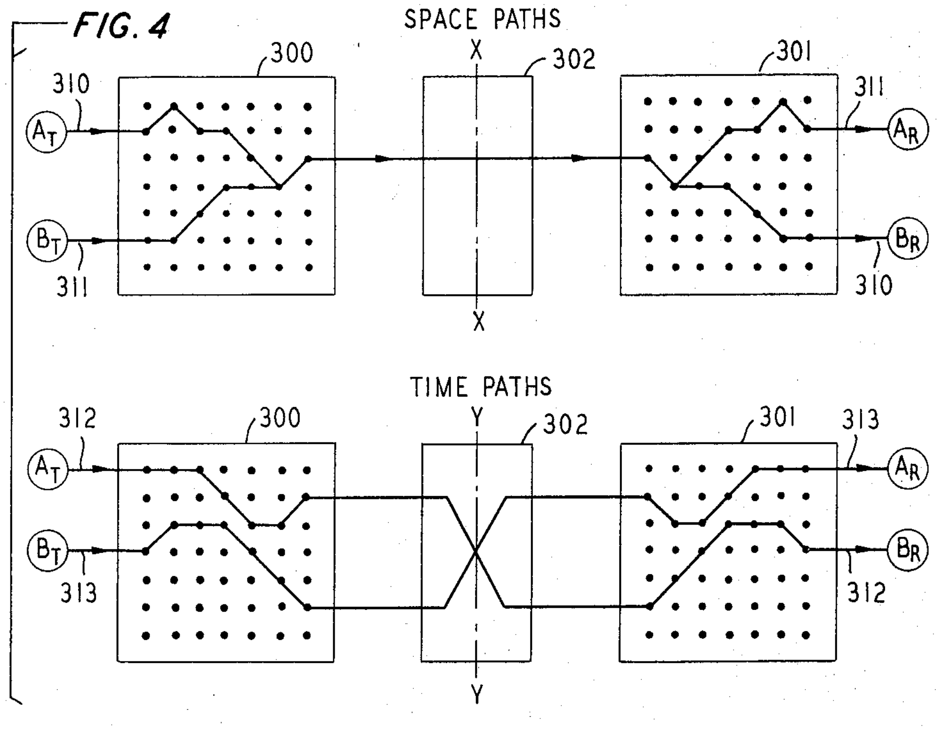
FIG. 4 illustrates certain spatial and temporal symmetries in the connections in a switching network which facilitate an understanding of this invention.

FIG. 4 illustrates schematically the symmetry in the topology of the most efficient connection paths in a complete switching system. Discussion is here restricted to the class of switching systems wherein time slot interchangers are connected centrally between switching stages. FIG. 4 shows switching networks 300 and 301 connected by time slot interchanger bank 302. Space and time paths through these elements are represented symbolically only, with deviations from the horizontal representing different levels in switching stages, in the case of the space paths, and different time slots, in the case of the time paths.

It is not necessary for an understanding of the basic symmetry properties to depict the switching networks 300 and 301 and the time slot interchanger bank 302 in detail. However, it is clear that each dotted junction in FIG. 4 represents an individual switching matrix of the non-bilateral crosspoint storage variety. Each column of dotted junctions represents a stage of switching, while each row represents a particular level, in the case of the space paths, or a particular time slot, in the case of the time paths.

In FIG. 4 sources of digital signals from subscribers A and B are represented by transmitting terminals $A_T$ and $B_T$. Terminals for receiving switched digital signals to be directed to subscribers A and B are in turn represented by receiving terminals $A_R$ and $B_R$, respectively. Omitted from this figure for the sake of simplicity is the line unit which typically connects $A_T$ and $A_R$, providing for multiplexing and demultiplexing the digital signals onto a single subscriber loop. Similarly, the line unit for subscriber B is omitted. Also not shown are paths for other digital signals which may be multiplexed onto the same or different input and output highways as used by subscribers A and B.

It is appropriate at this point to consider one aspect of terminology. The term time slot interchanger is used exclusively in this application to designate a device which provides a completely general capability for arbitrary time slot interchanges within frames. Thus, the crosspoint storage switching arrays, both non-bilateral (prior art) and bilateral, which do indeed provide some time slot interchange capability, are not considered time slot interchangers, since the time slot interchanges they are able to provide are not arbitrary, but depend upon the sequence in which output highways are designated for incoming bits.

Space path 310 is seen to constitute the transmission path from subscriber A to subscriber B. Space path 311 constitutes the transmission path from subscriber B to subscriber A. It is generally true that subscriber A must transmit and receive at the same spatial level, for the sake of simplicity and ease of wiring the system. Hence, subscriber A is represented at the same vertical level on both sides of the system. The same is true for subscriber B. These two paths between subscribers A and B are selected to be symmetric about vertical line X—X. The reason for this selection of symmetric paths is related to desirable efficiency in the central network control which must select paths for each call in progress to avoid blocking. In a typical switching system, the central network control computes a non-blocked transmission path from, say, subscriber A to subscriber B. It is known that a symmetric path from subscriber B to subscriber A exists which is also non-blocked. It is wasteful, then, to have the central network control compute a new transmission path from subscriber B to subscriber A. Rather, the symmetric path, as illustrated in FIG. 4, is chosen.

Time path 312 is the transmission path from subscriber A to subscriber B, and time path 313 is the transmission path from subscriber B to subscriber A. From consideration of these time paths, it is clearly evident that the switching networks 300 and 301 are of the aforementioned crosspoint storage type having time slot rearrangement capability. Time paths through more conventional networks without such a capability would be represented by horizontal lines, since the same time slot would be used throughout the network. It is generally true that subscriber A must transmit and receive in the same time slot. Hence, subscriber A is represented at the same vertical level on both sides of the time path diagram. The same is true for subscriber B. The two time paths 312 and 313 are selected to be symmetric about vertical lines Y—Y, for the same symmetry-related reason discussed above.

The bilateral switching arrangements of the present invention take advantage of the fact that both the space and time paths are symmetric through switching networks 300 and 301. Accordingly, the two networks are combined into a single bilateral switching network. Visualized geometrically in terms of FIG. 4, this combining can be represented by a folding of network 301 about axes X—X and Y—Y so that it becomes congruent with network 300. The two non-bilateral crosspoint storage switching matrices at each pair of congruent dotted junctions are combined into a single bilateral crosspoint storage switching array. FIG. 3, discussed above, represents a 4 × 4 bilateral switching matrix suitable for inclusion in such a network. The set of input highways 170 through 173 and the set of output highways 185 through 188 correspond to paths through network 300 in FIG. 4. The other set of input highways 175 through 178 and the set of output highways 180 through 183 correspond to the symmetric paths through network 301. The symmetry properties outlined above make it possible to combine the two networks so that common local controls the line common bilateral crosspoint stores may be used in setting up the symmetric paths. The manner in which this is accomplished will become clear in the subsequent discussion of FIGS. 5–7.

It is also the case that due to symmetry properties the bank of time slot interchangers 302 connected in links between switching stages of networks 300 and 301 can be reduced to a bank of half as many bilateral time slot interchangers. The manner in which a bilateral time slot interchanger replaces two prior art time slot interchangers is described in detail in my copending application, Ser. No. 214,144, filed Dec. 30, 1971.

THE BILATERAL SWITCH

In order to discuss in detail the operation of the basic bilateral switch, reference will be made to the 2 × 2 switch of FIG. 5. Discussion of this switch, rather than the 4 × 4 switch of FIG. 3, will simplify the exposition while still making clear the principles of the invention.

Figure 5:
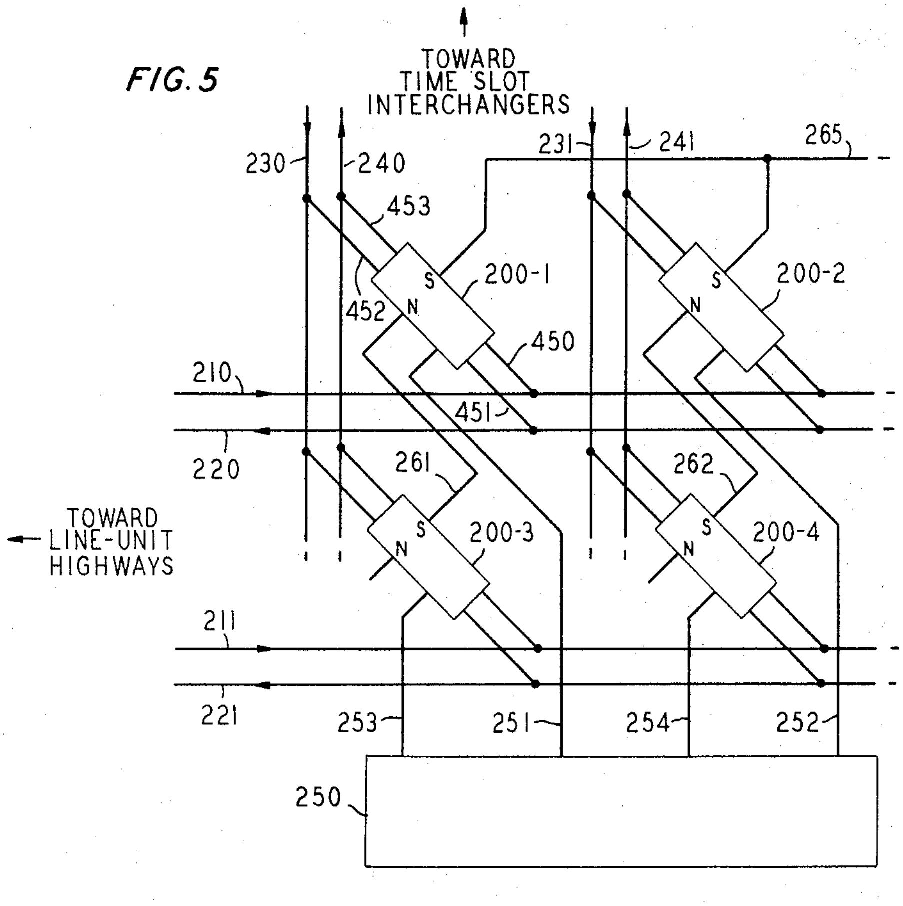
FIG. 5 illustrates another time division switching array constructed according to the teachings of this invention.

In FIG. 5 bilateral crosspoint stores 200-1, 200-2,200-3, and 200-4 are connected by input highways 210, 211, 230, and 231, and output highways 220, 221, 240, and 241. Local control 250 is connected to the bilateral crosspoint stores by transact control lines 251, 252, 253, and 254. Local control 250 is of the same type discussed, for example, in the aforementioned Marcus U.S. Pat. No. 3,573,381. It typically contains a control memory designed to be accessed serially. For example, a memory of the reentrant shift register type well known in the telephone switching arts may be used. Alternately, a memory of the general type exemplified by the recirculating delay line and pulse shifter control described with reference to FIG. 5 of U.S. Pat. No. 3,446,917, issued to H. Inose et al. on May, 27, 1969, may be used. Local control 250 also typically contains a simple decoding matrix designed to select a unique one of control lines 251–254 for each different word read from the control memory. Control lines 261 and 262 connect bilateral crosspoint stores 200-1 with 200-3 and 200-2 with 200-4, respectively.

It will be convenient to refer to the switch of FIG. 5 as having a line unit highway "side" and a time slot interchanger "side." In this regard the line unit highway side of the 4 × 4 switch is simply that side of the switch closest to the line unit highways. Other switching stages may be interposed between the switch of FIG. 5 and the actual line unit highways. Likewise, the time slot interchanger side of the switch need not be connected directly to time slot interchangers, but may instead be followed by subsequent bilateral switching stages.

Input highways 210 and 211, together with output highways 240 and 241, furnish transmission paths from theline unit highway side of the switch to the time slot interchanger side of the switch. These highways correspond to paths through network 300 of FIG. 4. Input highways 230 and 231 and output highways 220 and 221 furnish, on the other hand, connections for transmission paths from the time slot interchanger side of the switch to the line unit highway side of the switch. These latter highways correspond to paths through network 301 of FIG. 4.

In each time slot in which message data appears, local control 250 selects and activates one of control lines 251 and 252. The activated control line causes its associated bilateral crosspoint store 200-1 or 200-2 to receive and store the bit present on input highway 210 in that time slot. Each bit appearing on input highway 210 is therefore routed to either bilateral store 200-1 or bilateral store 200-2 depending on which control line is activated. These stored bits are to be transmitted in the next frame to the one of output highways 240 and 241 which corresponds to the selected store. Simultaneously, as the bit from input highway 210 is stored, the activated control line causes its associated bilateral store to transmit a bit previously stored in the preceding frame to output highway 220. As will be seen, these previously stored bits were received from either input highway 230 or input highway 231. Each bit transmitted on output highway 220 thus comes from one of stores 200-1 and 200-2, depending on whether control line 251 or control line 252 is activated.

Likewise, in each time slot in which message data appears, local control 250 selects and activates one of control lines 253 and 254. The activated control line causes its associated bilateral crosspoint store 200-3 or 200-4 to receive and store a bit from input highway 211 and to transmit a bit previously stored in the preceding frame to output highway 221. The bits received and stored from input highway 211 are to be transmitted in the next frame to the output highway 240 or 241 corresponding to the selected store. The previously stored bits transmitted on output highway 221 were received from the input highway 230 or 231 which is associated with the selected crosspoint store.

Thus far the transmission and reception of bits from input highways 210 and 211 and output highways 220 and 221 (line unit highway side) have been considered. As has been seen, the input and output operations associated with these highways proceed under the direction of local control 250.

The input and output operations governing the reception and transmission of bits on input highways 230 and 231 and output highways 240 and 241 (time slot interchanger side) do not proceed under the direction of local control 250. Instead, these operations proceed from one crosspoint store to the next, down each column. At the beginning of each frame, the START terminals S of bilateral stores 200-1 and 200-2 are activated by control line 265. This initiates a sequence of input and output operations for the time slot interchanger side of the network.

When a TRUE signal is applied at START terminal S of a bilateral store, that bilateral store begins to deliver, to its associated output highway on the side of the network nearest the time slot interchangers, in successive time slots, the group of bits which were stored in the previous frame from its associated input highway on the line unit highway side of the network. For each bit so delivered a bit is also stored from the associated input highway on the time slot interchanger side of the network, for transmission in the next frame on the associated output highway on the line unit highway side of the network. When the previously stored bits are exhausted, the bilateral store ceases to transmit and receive on the time slot interchanger side highways, and causes a signal on its NEXT terminal, N, to assume the TRUE state.

With an understanding of the sequence of operations initiated when the START terminal S of a particular bilateral store is activated, the input-output operations on the time slot interchanger side of the entire 2 × 2 switch can now be considered in greater detail.

When control line 265 becomes TRUE at the beginning of a frame, bilateral store 200-1 begins transmitting on output highway 240 the group of bits it received from input highway 210 in the previous frame. It receives and stores from input highway 230 a number of bits equal to those transmitted on output highway 240. These bits are stored for subsequent transmission on output highway 220 in the next frame. When the bits to be transmitted on output highway 240 are exhausted, bilateral store 200-1 ceases to transmit and receive on time slot interchanger side highways 230 and 240, and NEXT terminal N becomes TRUE.

The TRUE signal at NEXT terminal N of bilateral crosspoint store 200-1 is transferred via control line 261 to the START terminal S of bilateral store 200-3. Bilateral store 200-3 then begins transmitting on output highway 240 the group of bits it received from input highway 211 in the previous frame. It receives and stores from input highway 230 a number of bits equal to that transmitted on output highway 240. These bits are stored for subsequent transmission on output highway 221 in the next frame. When the bits to be transmitted on output highway 240 from bilateral store 200-3 are exhausted, bilateral store 200-3 ceases to transmit and receive on time slot interchanger side highways 230 and 240.

The interaction of bilateral crosspoint stores 200-2 and 200-4, in the second column of the 2 × 2 switch, with time slot interchanger side input and output highways 231 and 241 proceeds in a manner exactly analogous to the operation of bilateral stores 200-1 and 200-3, discussed in the preceding two paragraphs.

In summary, the most salient points related to the control and operation of the 2 × 2 switch of FIG. 5 are that the input-output interactions of the bilateral crosspoint stores with the highways on the line unit highway side of the matrix are controlled by local control 250. The input-output interactions of the bilateral crosspoint stores with the highways on the time slot interchanger side of the network proceed from one crosspoint store to the next, down each column in the matrix. Bits received from input highways on either side of the matrix in one frame are transmitted to output highways on the alternate side of the matrix in the subsequent frame.

Figure 6:
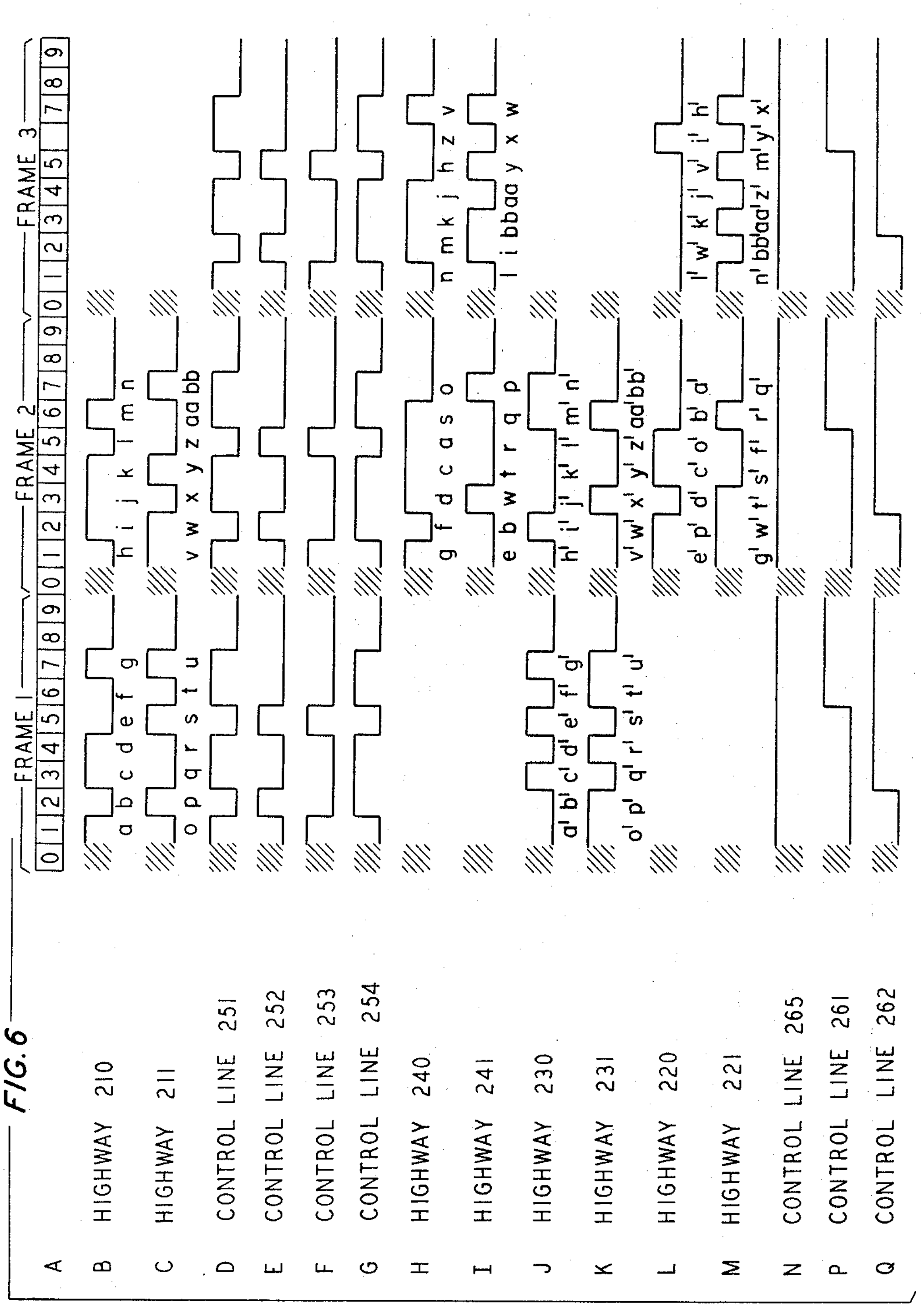
FIG. 6 shows various bit patterns which are examples of those which may occur during the operation of the array of FIG. 5.

The operation of the 2 × 2 switch of FIG. 5 has been described in functional terms without reference to the particular circuitry included in the bilateral crosspoint stores 200-1 through 200-4. Before discussing the detailed structure of the bilateral crosspoint stores themselves, it is desirable to elaborate still further with regard to the functional description of the switch of FIG. 5. FIG. 6 presents examples of typical bit patterns which may appear in various time slots on the input and output highways of FIG. 5, together with the signals appearing on control lines 251 through 254, 261, 262, and 265. These bit patterns serve to illustrate the time slot mappings in space and in time which the 2 × 2 bilateral switch of FIG. 5 performs.

FIG. 6 assumes the well-known principle that data in a time division multiplexed communication system occurs in intervals known as time slots. Each time slot typically corresponds to a particular communication channel. Time slots are grouped together into frames, a frame being the largest sequence of successive time slots which includes no more than one time slot corresponding to a given communication channel.

FIG. 6, line A, shows three time division multiplex signal frames each having 10 time slots. There are nine traffic time slots in each frame. Traffic time slots are those time slots which represent sampled communication data, and are to be distinguished from other time slots in a frame which may be added for purposes of synchronization. Each numbered box within FIG. 6, line A, represents a particular time slot. The single synchronization time slot is numbered "0," while the nine traffic time slots are numbered 1–9.

As indicated in FIG. 6, lines B-M, information is carried in each traffic time slot in the form of a binary "1" or "0." Thus each time slot corresponds to one bit. In general time division communication systems may be designed so that each time slot corresponds to $q$ bits, where $q$ is a positive integer. If $q$ is greater than one, each time slot will contain sampled data comprising more than one bit. For purposes of clarity, the discussion here is restricted to a system where $q = 1$. However, as will be apparent to those skilled in the art, generalizations to the systems where $q > 1$ are easily made. The present invention, therefore, is in no way restricted to systems having only one bit per time slot.

Although the frames shown in FIG. 6, line A, have only a single synchronization time slot, it should be noted that a plurality of synchronization time slots may be used to provide necessary or desirable synchronization and error-checking capabilities. A time division signal frame with one synchronization time slot is used for purposes of illustration only, and the instant invention is in no way restricted to systems employing only a single synchronization time slot. It should be pointed out that synchronization data is not necessarily carried on the same communication lines as message data. Rather synchronization pulses on specially dedicated control lines, occurring in the synchronization time slots, more typically provide synchronization, as will become clear later in this detailed description.

FIG. 6, lines B and C, show typical sequences of binary signals which appear in frames 1 and 2 on input highways 210 and 211, respectively. The bits on highway 210 are labeled *a-n* and those on highway 211 are labeled *o-bb.* The letter designations are useful in identifying bits appearing on the input highways with the corresponding bits appearing later on the output highways. It is noted that only seven of the available nine time slots are in use for message data. The remaining time slots 8 and 9 are available to accommodate added calls.

As noted previously the bits which appear on input highways 210 and 211 in one frame appear in the next frame on output highways 240 and 250. The routing of these individual bits in space and time paths through the 2 × 2 switch is determined by the control signals appearing on control lines 251–254, which are represented in FIG. 6, lines D–G, respectively. These control signals are merely typical, and represent a particular mapping in space and time. A different set of control signals would determine a different mapping. It should be noted that in FIG. 6, lines D–G, the control signals are repetitive in each of the three frames shown. This indicates that the call routing does not change during these three frames. When additional calls are set up and when completed calls are released, it is necessary to alter the control signals in order to provide paths for the added calls or to release unused paths and rearranged the remaining paths left when a call is released. Presently, it is assumed that call routing remains constant from frame to frame.

Control line 251 is activated in time slots 1, 3, 4, 6, and 7. This causes bits *a, c, d, f,* and *g,* received on input highway 210 in frame 1, to be stored in bilateral crosspoint store 200-1. Control line 252 is activated in time slots 2 and 5. This, in turn, causes bits *b* and *e,* received on input highway 210 in frame 1, to be stored in bilateral crosspoint store 200-2.

Control line 253 is activated in time slots 1 and 5. Therefore bits *o* and *s,* received on input highway 211 in frame 1, and stored in bilateral crosspoint store 200-3. Control line 254 is activated in time slots 2, 3, 4, 6 and 7. Accordingly, bits *p, q, r, t,* and *u,* received on input highway 211 in frame 1, are stored in bilateral crosspoint store 200-4.

At the conclusion of frame 1, therefore, bits *a, c, d, f,* and *g* have been stored in bilateral store 200-1, bits *b* and *e* have been stored in store 200-2, bits *o* and *s* have been stored in store 200-3, and bits *p, q, r, t* and *u* are stored in store 200-4.

The manner in which these bits are transmitted on output highways in frame 2 is determined by the store-by-store output sequence, proceeding down each column, referred to previously. When, at the beginning of frame 2, control line 265 is activated (FIG. 6, line N), store 200-1 begins transmitting the bits it stored in frame 1 to output highway 240. These bits are stored and transmitted on a last in-first out basis so that bits *g, f, d, c,* and *a* are transmitted on output highway 240 in time slots 1–5 of frame 2. When these bits are exhausted, NEXT terminal N of bilateral store 200-1 activates START terminal S of bilateral store 200-3 via control line 261, as illustrated by FIG. 6, line P. Bilateral store 200-3 then begins transmitting the bits it stored in frame 1 to output highway 240. These bits are of course also transmitted in an order inverse to that in which they were received, so that bits *s* and *o* are transmitted on output highway 240 in time slots 6 and 7 of frame 2. In summary, then, the bits transmitted on output highway 240 in frame 2 are *g, f, d, c, a, s,* and *o* in time slots 1–7.

The bits transmitted on output highway 241 in frame 2 can be determined in like manner. The activation of control line 265 at the beginning of frame 2 causes store 200-2 to transmit, in inverse order, the bits it stored in frame 1. Accordingly, bits *e* and *b* are transmitted on output highway 251 in time slots 1 and 2 of frame 2. The exhausting of these bits causes NEXT terminal N of store 200-2 to activate START terminal S of store 200-4 via control line 262, as illustrated in FIG. 6, line Q. Bilateral store 200-4 then begins transmitting, in inverse order, the bits it stored in frame 1. Accordingly, bits *u, t, r, q,* and *p* are transmitted on output highway 241 in time slots 3–7 of frame 2. The bits transmitted on this output highway in time slots 1–7 of frame 2 are, then, bits *e, b, u, t, r, q,* and *p.*

The routing of bits from the line unit highway side of the 2 × 2 matrix of FIG. 5 to the time slot interchanger side has not been described. (This routing corresponds to that through network 300 of FIG. 4.) It is noted that a bit appearing on either input highway 210 or 211 may be routed to either output highway 240 or 241. According to the order in which bits are stored, a bit appearing on one of these input highways may appear in the same or in a different time slot when it is transmitted on an output highway in the next frame.

It may be recalled that the bit routings from the line unit highway side of the switch to the time slot interchanger side of the switch are the same as those described in the aforementioned Marcus U.S. Pat. No. 3,573,381. The control signals appearing on control lines 261–262, 265, and 251–254 of FIG. 5 are analogous to those appearing on corresponding control lines in the Marcus patent. Local control 250 may be identical to that used in the operation of the corresponding switch in the Marcus patent This invention differs from that disclosed in the Marcus patent in the same local control and control lines used to control the bit routings from input highways on the line unit highway side of the network to output highways on the time slot interchanger side of the network are used to control symmetric bit routings from input highways on the time slot interchanger side of the network to output highways on the line unit highway side of the network (The symmetric routing corresponds to the routing through network 301 of FIG. 4.)

In considering in detail the routing of bits from input highways 230 and 231 on the time slot interchanger side of the 2 × 2 switch to output highways 220 and 221 on the line unit highway side of the switch, attention is first directed to FIG. 6, lines J and K, which illustrate typical sequence of bits such as may appear on input highways 230 and 231, respectively. The bits on highway 230 are labeled *a'–n',* and those on highway 231 are labeled *o'–bb'.*

As was noted above the bits received on each of input highways 230 and 231 are stored in bilateral stores in their corresponding columns, beginning with the uppermost stores in each column and progressing down each column. The number of bits stored in each store is the same as the number of bits transmitted from that store to output highway 240. This number is determined by the number of bits received and stored by that store from input highway 210 in the preceding frame. Since it is assumed that the call routings remain constant, the number of bits stored from input highway 210 in the frame preceding frame 1 is five. In time slot 1 of frame 1 control line 265 is activated, causing the first five bits *a', b', c', d',* and *e'* from input highway 230 to be stored in bilateral store 200-1 in frame 1. When these bits have been stored, control line 261 is activated, enabling bilateral store 200-3 to store bits *f'* and *g'.*

Likewise, in time slot 1 of frame 1, the activation of control line 265 causes bilateral store 200-2 to begin storing bits from input highway 231. Since bilateral store 200-2 stores two bits in each frame from input highway 210, that bilateral store will store two bits, *o'* and *p',* from input highway 231. When these bits have been stored, NEXT terminal N of bilateral store 200-2 activates START terminal S of bilateral store 200-3 via control line 262. Since bilateral store 200-4 stored five bits from input line 211 in the frame preceding frame 1, the five bits q', r', s', t', and u' will be stored in bilateral store 200-4 in frame 1.

In summary, at the conclusion of frame 1, bits *a'*, *b'*, *c'*, *d'*, and *e'* are stored in bilateral store 200-1, bits *o'* and *p'* are stored in store 200-2, bits *f'* and *g'* are stored in store 200-3, and bits *q'*, *r'*, *s'*, *t'*, and *u'* are stored in store 200-4.

The manner in which these stored bits are transmitted to output highways 200 and 221 in frame 2 is determined directly by the control signals present on control lines 251-254 during frame 2. In time slot 1 of frame 2, control lines 251 and 253 are activated, causing bit *e'* to be transmitted from bilateral store 200-1 to output highway 220 and bit *g'* to be transmitted from bilateral store 200-3 to output highway 221. In time slot 2 control lines 252 and 254 are activated, causing bit *p'* to be transmitted from bilateral store 200-2 to output highway 220 and bit *u'* to be transmitted from bilateral store 200-4 to output highway 221. In time slot 3, control lines 251 and 254 are activated, causing bit *d'* to be transmitted from bilateral store 200-1 to output highway 220 and bit *t'* to be transmitted from bilateral store 200-4 to output highway 221. The transmittal of bits from output highways 220 and 221 continues in a similar manner during the remaining time slots 4–7 of frame 2. In each time slot one of control lines 251 and 252 and one of control lines 253 and 254 is activated, determining which store in the involved row will transmit a bit to that row's output highway in that time slot. The bits stored in the bilateral stores are, as before, transmitted in the inverse order from that in which they were received. Following this procedure it is easily concluded that on output highway 220 will appear bits *e'*, *p'*, *d'*, *c'*, *o'*, *b'*, and *a'* and on output highway 221 will appear bits *g'*, *u'*, *t'*, *s'*, *f'*, *r'*, and *q'* in time slots 1–7 of frame 2.

Now that the routing of bits in space and time from the time slot interchanger side of the switch to the line unit highway side of the switch has been described in detail, it is appropriate to consider the symmetry between this latter routing and the earlier described routing of bits from the line unit highway side of the switch to the time slot interchanger side of the switch. In accordance with this symmetry, if a bit received on one input highway on the line unit highway side of the switch in time slot $\eta$ is routed to a particular output highway on the time slot interchanger side of the switch in time slot $\xi$, then a bit received in time slot $\mu$ on the input highway on the time slot interchanger side of the switch adjacent the aforementioned output highway should be routed to the output highway adajcent the aforementioned input highway on the line unit highway side of the switch in time slot $\eta$.

Verification of this symmetry may be made by reference to the particular example of FIG. 6, lines A–C and H–N. For example, bit *a* in time slot 1 of frame 1, received on input highway 210, it routed to time slot 5 of frame 2 on output highway 240. In the symmetric routing, bit *e'* in time slot 5 of frame 1, received on input highway 230, is routed to time slot 1 of frame 2 on output highway 220.

It is useful to make at this point an observation with respect to the control signals on control lines 251–254 shown in FIG. 6, lines D–H. It is noteworthy that one and only one of control lines 251 and 252 and one and only one of control lines 253 and 254 are activated in each time slot in which message data appears. This is consistent with the fact, noted previously, that only one time slot interchanger in each row is enabled to receive and transmit bits on its line unit highway side input and output highways in each time slot. This remains the case if switches of larger dimension than 2 × 2 are considered.

The typical bit samples illustrated in frame 2 of FIG. 6, lines B, C, J, and K, as well as those in frame 3 of FIG. 6, lines H, I, L, and M, have not been considered explicitly. It is clear, however, that these bits represent the frame of input bits and the resulting frame of output bits immediately succeeding the frames discussed in detail above. Since it is assumed that the routing of bits does not change during the succession of frames depicted in FIG. 6, lines A–Q, the frames not discussed in detail do not reveal further information about the operation of the 2 × 2 switch. It may easily be verified that the input bits in frame 2 of FIG. 6, lines B, C, J, and K do in fact result in the output bits in frame 3 of FIG. 6, lines H, I, L, and M under th conditions imposed by the control signals shown in FIG. 6, lines D–G.

THE BILATERAL CROSSPOINT STORE

Figure 7:
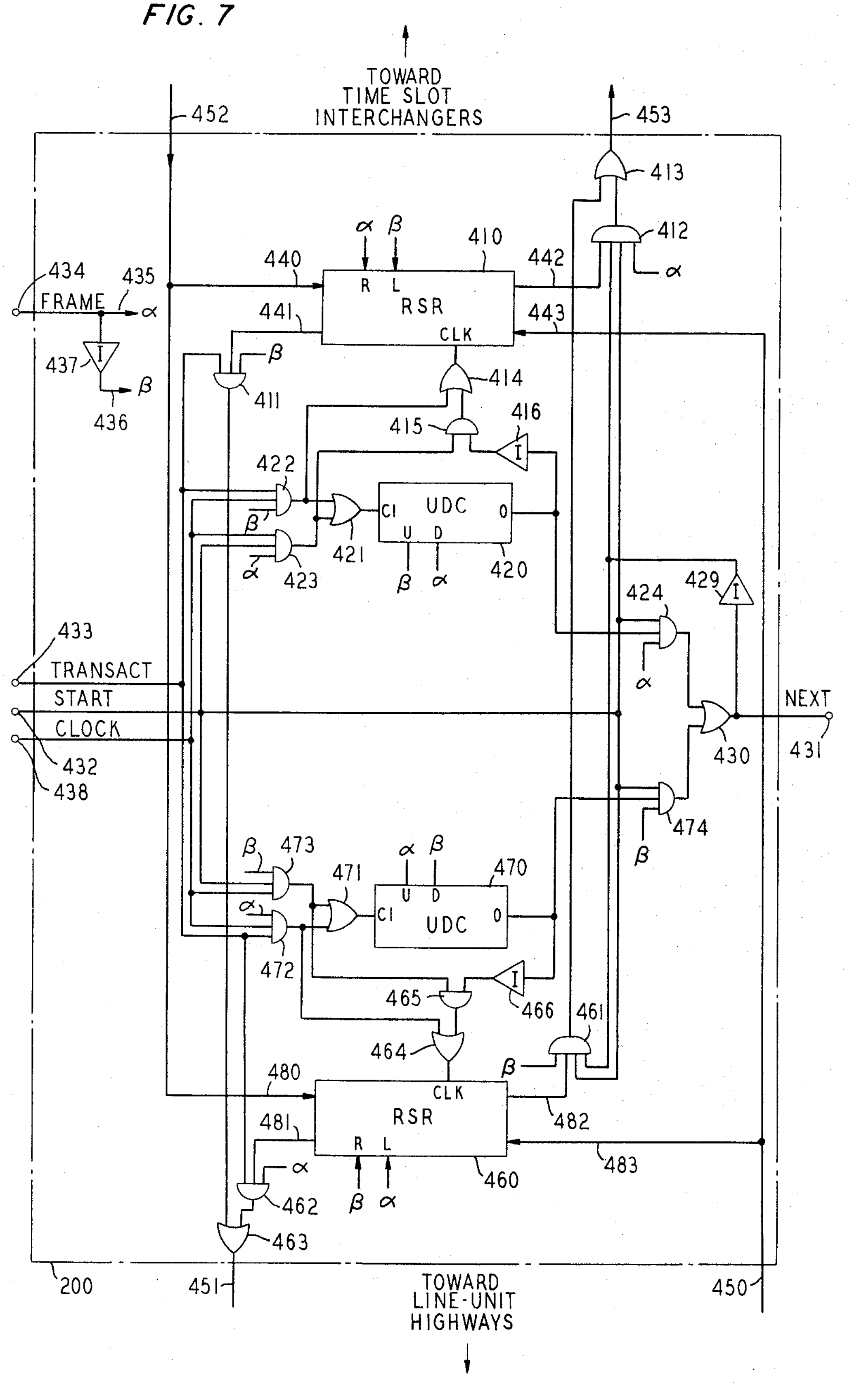
FIG. 7 shows in detail an embodiment of crosspoint store constructed according to the teachings of this invention.

FIG. 7 illustrates a bilateral crosspoint store constructed according to the teachings of this invention. This bilateral crosspoint store 200 has a pair of line unit highway side input and output lines 450 and 451, and a pair of time slot interchanger side input and output lines 452 and 453. If this crosspoint store is used, for example, as corsspoint store 200-1 of FIG. 5, input and output lines 450 and 451 will be connected to line unit highway side input and output highways 210 and 220, respectively. Input and output lines 452 and 453 will in turn be connected to time slot interchanger side input and output highways 230 and 240, respectively.

The bilateral crosspoint store 200 also makes use of several control terminals. In the application of store 200 as store 200-1 in FIG. 5, TRANSACT control terminal 433 is to be connected to control line 251. START control terminal 432 is to be connected to control line 265 of FIG. 5. NEXT control terminal 431 is to be connected to control line 261. The functions of the control lines 265, 251, and 261 were described with reference to FIG. 5. The interaction of the signals on these control lines with the detailed circuitry of FIG. 7 will become clear below. Also included is a network CLOCK terminal 438 to which clock pulses are applied in each time slot of every frame.

The major components in bilateral crosspoint store 200 are two reversible shift registers 410 and 460, and two up-down counters 420 and 470. The basic function of the shift registers is to receive and store bits from input lines 450 and 452 and to transmit the stored bits in a subsequent frame to output lines 451 and 453. The basic function of the up-down counters 420 and 470 is to keep a running tally of the number of bits stored in each reversible shift register.

The principles of design applicable to shift registers 410 and 460 and up-down counters 420 and 470 are well known. Shift registers, including reversible and other multimode registers, are described, for example, in *Manual of Logic Circuits*, by G. A. Maley, Prentice-Hall (1970), pp. 126 ff. Up-down (bidirectional) counters are described, for example, in *Logic Circuits*, by N. M. Morris, McGraw-Hill (1969), p. 86, and in *Manual of Logic Circuits*, supra, at p. 202. Up-down counters 420 and 470 must be saturable, i.e., they must not count down from all 0's or up from all 1's. It is well known to provide this feature in synchronous up-down counters.

In accordance with this invention, a desirable hardward economy in bilateral cross point store 200 is achieved through interchanging the roles of reversible shift registers 410 and 460 and also of up-down counters 420 and 470 in alternate frames. In order to effect this interchange of roles a FRAME signal is provided on terminal 434. This signal is alternated by TRUE and FALSE in successive frames. An inverter 437 is provided so that an inverted $\overline{\text{FRAME}}$ signal is provided on line 436. The FRAME signal is provided directly to line 435. The FRAME and $\overline{\text{FRAME}}$ signals appearing on lines 435 and 436 are labeled $\alpha$ and $\beta$, respectively.

Signals $\alpha$ and $\beta$ are applied at various locations throughout bilateral crosspoint store 200 in order to effect the interchanges of role of the reversible shift registers and the up-down counters. FIG. 8 comprises a chart which sets forth the roles of these components in alternate frames. Reference to this chart will aid in an understanding of the following descriptive material.

As can be seen from FIG. 8, in the frames during which $\alpha$ is TRUE, reversible shift register 410 receives bits from input line 452 and transmits bits to output line 453. It should be remembered that the bits received from input line 452 are not transmitted to output line 453 in the same frame, or in fact at all. Instead the bits received from input line 452 are routed to output line 451 in a later frame, and the bits transmitted to output line 453 are received from input line 450 in an earlier frame. Input and output ines 452 and 453 are adapted to be connected to time slot interchanger side input and output highways. As noted above the input and output interactions with these highways proceed from one bilateral crosspoint store to the next, down each column in a switch, as the successive START terminals of each store are activated. Accordingly, as also noted in FIG. 8, reversible shift register 410 receives clock pulses at its clock input terminal CLK only when START terminal 432 and network CLOCK terminal 438 are activated, and when up-down counter 420 is not in its "0" state. When up-down counter 420 reaches its "0" state it is indicated that the bits stored in reversible shift register 410 in the previous frame from input line 450 have been exhausted and that no further input and output interactions with lines 452 and 453 are to be performed. During the frames in which $\alpha$ is TRUE, reversible shift register 410 shifts right upon the application of each clock pulse at terminal CLK.

As was noted above, up-down counter 420 functions to keep a running tally of the number of bits stored in reversible shift register 410. In each frame during which $\alpha$ is TRUE this counter counts downward upon the application of each pulse at its clock input terminal CL. These clock pulses are applied only when both START input terminal 432 and CLOCK input terminal 438 are TRUE.

Meanwhile reversible shift register 460, in the frames in which $\alpha$ is TRUE, receives bits from line 450 and transmits other bits to line 451. As previously indicated in connection with FIG. 5, the bits received from line 450 and not themselves transmitted to line 451 but instead are transmitted in a later frame to output line 4553. Likewise the bits transmitted to line 451 are received in an earlier frame from input line 452. Input and output lines 450 and 451 are adapted to be connected to line unit highway side input and output highways. The input and output interactions with these highways are directed by control memory 250 through the application of signals to TRANSACT control terminal 433. Therefore reversible shift register 460 has clock pulses applied to its clock terminal CLK only when both TRANSACT terminal 433 and network CLOCK terminal 438 are simultaneously TRUE. Shift register 460 shifts left upon the application of each of these clock pulses.

Meanwhile up-down counter 470 counts up upon the application of each clock pulse to its clock input terminal CL. These clock pulses are essentially the same as those applied to clock input terminal CLK of shift register 460. It is the function of up-down counter 470 to determine the total number of bits stored in reversible shift register 460 from input line 450 during the frames for which $\alpha$ is TRUE.

Having described the major roles played by each of the reversible shift registers and up-down counters during the frames for which $\alpha$ is TRUE, the roles played by these same components when $\beta$ is TRUE must next be considered. The roles of the reversible shift registers 410 and 460 are essentially reversed, as are the roles of up-down counters 420 and 470. Reversible shift register 410 receives bits from line 450 and transmits bits to output line 451. It shifts left upon the application of each pulse to its clock input terminal CLK. These pulses are applied when both TRANSACT terminal 433 and CLOCK terminal 438 are simultaneously TRUE.

Reversible shift register 460, on the other hand, receives bits from input line 452 and transmits bits to output line 453. It shifts right upon the application of each pulse to its clock input terminal CLK. These pulses occur only when START input terminal 432 and CLOCK terminal 438 are TRUE and when up-down counter 470 is not in its "0" state.

Up-down counter 420 counts up upon the application of each pulse to its clock input terminal CL. Such pulses are applied whenever both TRANSACT terminal 433 and CLOCK terminal 438 are TRUE simultaneously. Up-down counter 470 counts down upon the application of each clock pulse to its clock input terminal CL. Such pulses are applied whenever both START terminal 432 and network CLOCK terminal 438 are simultaneously TRUE.

Now that the basic functions of reversible shift registers 410 and 460 and up-down counters 420 and 470 have been defined, only the particular gating circuitry which directs the operation of these components remains to be described.

First, the gating circuitry which connects reversible shift registers 410 and 460 to the appropriate input and output lines will be considered. Input line 450 is connected both to input lead 443 of reversible shift register 410 and to input lead 483 of reverisble shift register 460. However only the one of these shift registers which is enabled to shift in the left direction may receive bits from input line 450 in any given frame. The bits on input line 450 are ignored by the shift register which is right-enabled.

Likewise, input line 452 is connected both to input lead 440 of reversible shift register 410 and to input lead 480 of reversible shift register 460. Only the one of these shift registers which is right-enabled may receive bits from input line 452 in any given frame. The bits on input line 452 are ignored by the shift register which is left-enabled.

Output line 451 is connected through OR gate 463 to AND gate 411 and 462. These AND gates in turn receive bits from output leads 441 of shift register 410 and 481 of shift register 460, respectively. By virtue of $\alpha$ and $\beta$ signal inputs to these AND gates, only AND gate 462 may be enabled in a frame in which $\alpha$ is TRUE, and only AND gate 411 may be enabled in a frame in which $\beta$ is TRUE. Each of AND gates 411 and 462 also has an input lead connected to TRANSACT terminal 433. Therefore neither of these gates can be enabled unless TRANSACT terminal 433 is TRUE. This fact is consistent with the earlier statement that output operations on the line unit highway side of bilateral crosspoint store 200 are governed by signals supplied from control memory 250 to TRANSACT terminal 433. Gates 411 and 462 insure that an output bit from one of shift registers 410 and 460 can reach output line 451 only if TRANSACT terminal 433 is TRUE.

Output line 453 is connected through OR gate 413 to AND gates 412 and 461. These AND gates in turn receive bits from output leads 442 of shift register 410 and 482 of shift register 460, respectively. By virtue of $\alpha$ and $\beta$ signals applied to inputs of these AND gates, only AND gate 412 may be enabled in a frame in which $\alpha$ is TRUE, and only AND gate 461 may be enabled in a frame in which $\beta$ is TRUE. Each of AND gates 412 and 461 also has an input lead connected to START terminal 432. Therefore neither of these gates may be enabled unless START terminal 432 is TRUE. This fact is consistent with the earlier observation that output operations on the time slot interchanger side of bilateral crosspoint store 200 proceed from store to store down each column in a switch as the respective START terminals of each store are made TRUE. It was also noted previously that each bilateral crosspoint store provides a signal on its NEXT terminal whose purpose is to activate the START terminal of the store immediately below it in a switch. The NEXT terminal 431 of store 200 is made TRUE when the shift register transmitting bits to the time slot interchanger side output line 453 has exhausted the supply of bits it is transmitting to that output line (which bits were in turn stored in the previous frame from line unit highway side input line 450.) The manner in which NEXT terminal 431 is activated by up-down counters 420 and 470 will be discussed below. For present purposes it is sufficient to note that NEXT terminal 431 is connected through an inverter 429 to an input of each of AND gates 412 and 461. Accordingly, when NEXT terminal 431 becomes TRUE, the transmission of bits to output line 453 is inhibited. This is consistent with the fact that the supply of bits to be transmitted to this line is exhausted and with the fact that activation of NEXT terminal 431 is designed to signal another bilateral crosspoint store connected to the same time slot interchanger side output highway as is output line 453 to begin transmitting bits to that common output highway.

In the discussion of the circuitry of FIG. 7 undertaken up to this point, the connection of reversible shift registers 410 and 460 to input lines 450 and 452 and output lines 451 and 453 has been considered. Now it is appropriate to consider the gating circuitry which determines the time slots in which pulses are applied to clock inputs CLK of shift registers 410 and 460 and to clock inputs CL of up-down counters 420 and 470.

Clock pulses are applied to clock input CLK of shift registers 410 through OR gate 414. One of the two inputs to OR gate 414 is derived from the output of AND gate 422. As can be seen, AND gate 422 can be enabled in a frame in which $\beta$ is TRUE by the concurrence of a TRUE input on TRANSACT terminal 433 and a clock pulse on network CLOCK terminal 438. Reference can be made to FIG. 8 to verify that these conditions for the application of a clock pulse are correct, for frames in which $\beta$ is TRUE.

The remaining input to OR gate 414 is derived from the output of AND gate 415. One input of AND gate 415 is, in turn, derived from the output of AND gate 423. As can be seen, AND gate 423 can be enabled in a frame in which $\alpha$ is TRUE by the concurrence of a TRUE input on START terminal 432 and a clock pulse on network CLOCK terminal 438. The remaining input of AND gate 415 is derived from inverter 416, whose input is from the "0" terminal of up-down counter 420. This state sensing terminal is activated only when counter 420 is in its "0" state. A clock pulse will be applied to terminal CLK of shift register 410 through AND gate 415, then, when both START terminal 432 and network CLOCK terminal 438 are TRUE and when counter 420 is not in is "0" state. Again, this is consistent with the information contained in FIG. 8.

AND gates 422 and 423 also provided inputs to OR gate 421, whose output provides clock pulses to clock input CL of up-down counter 420. Accordingly, in frames in which $\alpha$ is TRUE a clock pulse is applied to counter 420 upon the concurrence of a TRUE signal on START terminal 432 and a clock pulse on network CLOCK terminal 438, In frames in which $\beta$ is TRUE, on the other hand, a clock pulse is applied to counter 420 upon the concurrence of a TRUE signal on TRANSACT terminal 433 and a clock pulse on network CLOCK terminal 438. The correctness of these clock signals may be verified with reference to FIG. 8.

Clock pulses are applied to clock input CLK of shift register 460 through OR gate 464. One of the two inputs to OR gate 464 is derived from the output of AND gate 472. As can be seen, AND gate 472 can be enabled in a frame in which $\alpha$ is TRUE by the simultaneous application of a TRUE signal on TRANSACT terminal 433 and a clock pulse on network CLOCK terminal 438.

The remaining input to OR gate 464 is derived from the output of AND gate 465. One input of AND gate 465 is, in turn, derived from the output of AND gate 473. AND gate 473 can be enabled in a frame in which $\beta$ is TRUE by the concurrence of a TRUE signal on START terminal 432 and a clock pulse on network CLOCK terminal 438. The remaining input of AND gate 465 is derived from inverter 466, whose input is from the "0" terminal of up-down counter 470. This state sensing terminal is activated only when counter 470 is in its "0" state. A clock pulse will be applied to terminal CLK of shift register 460 through AND gate 465, then, when both START terminal 432 and network CLOCK terminal 438 are TRUE and when counter 470 is not in its "0" state. Again, this is consistent with the information contained in FIG. 8, for frames in which $\beta$ is TRUE.

AND gates 472 and 473 also provide inputs to OR gate 471, whose output provides clock pulses to clock input terminal CL of up-down counter 470. Accordingly, in frames in which $\alpha$ in TRUE, clock pulses are applied to counter 470 upon the simultaneous occurrence of a TRUE signal on TRANSACT terminal 433 and a clock pulse on network CLOCK terminal 438. In frames in which $\beta$ is TRUE a clock pulse is applied to counter 470 upon the simultaneous occurrence of a TRUE signal on START terminal 432 and a pulse on network CLOCK terminal 438.

AND gates 424 and 474, together with OR gate 430 provide for signalling on NEXT terminal 431. NEXT terminal 431 is connected to the output of OR gate 430. One of the two inputs of OR gate 430 is connected to the output of AND gate 424 and the other is connected to the output of AND gate 474. In frames during which $\alpha$ is TRUE, AND gate 424 is enabled when START terminal 432 is TRUE and when, simultaneously, up-down counter 420 is in its "0" state. In frames in which $\beta$ is TRUE, AND gate 474 is enabled when START terminal 432 is TRUE and when, simultaneously, up-down counter 470 is in its "0" state. The enablement of either of AND gates 424 or 474 provides, through OR gate 430, a TRUE signal on NEXT terminal 431.

The above explained operation of gates 424, 430, and 474 is consistent with the required provision of signals on NEXT terminal 431 when bilateral crosspoint store is operating as a part of a switch such as previously discussed with reference to FIG. 5. When $\alpha$ is TRUE, shift register 410 transmits bits on its output line 442 to a time slot interchanger side output highway. When counter 420 reaches its "0" state, the exhaustion of these bits is indicated, and a TRUE signal on NEXT terminal 431 is provided to signal the store immediately below in the switch to begin transmission of bits to the common time slot interchanger side output highway. Similarly, when $\beta$ is TRUE, shift register 460 transmits bits on its output line 482 to a time slot interchanger side output highway. When counter 470 reaches its "0" state, the exhaustion of these bits is indicated, and a TRUE signal is provided on NEXT terminal 431.

The above-detailed discussion of FIG. 7 makes it clear that the bilateral crosspoint store 200 of FIG. 7 is suitable for inclusion in a bilateral crosspoint switch such as shown in FIG. 5. It is also clear however, that the present invention is not restricted to the particular component interconnections of FIG. 7. As will be appreciated by those skilled in the art, there exist functionally equivalent logic designs which may be substituted for store 200 which will still enable a switch as shown in FIG. 5 to perform identically appropriate time slot interchanges.

It is clear also that the embodiment of the bilateral crosspoint switch matrix disclosed with particularity herein is merely descriptive, and that many possible modifications within the scope of this invention will be appreciated by those skilled in the art. For example, the switch matrix need not be square, but may have unequal numbers of line unit highway side input-output pairs and time slot interchanger side input-output pairs. Also by duplicating circuitry in the crosspoint stores, it may be possible to interconnect more than two input-output pairs at each crosspoint, providing, for example, a common switching arrangement for digital signals corresponding to both voice and video parts of a televised conversation. The present invention is therefore intended to be limited only by the scope and spirit of the appended claims.

I claim:

1. In a crosspoint storage device for a switching matrix in a time division switching system comprising first input means, first output means, first and second storage means, means connecting said first input and said first output means to both of said storage means, and first control means for alternately directing, first, the simultaneous reception of information from said first input means by said first storage means and transmission of information to said first output means by said second storage means, and, then, the simultaneous reception of information from said first input means by said second storage means and transmission of information to said first output means by said first storage means, the improvement comprising:

A. second input means,

B. second output means,

C. a system or interconnecting and uniquely associating said first and second input and said first and second output means with both of said storage means comprising 1. means for applying, to said first storage means, signals appearing during selected time slots of a first time division frame on said first input means,
2. means for applying, to said second storage means, signals appearing during consecutive time slots of said first frame on said second input means,
3. means for reading from said first storage means and applying to said first output means during consecutive time slots of a second frame those signals stored in said first storage means during said first frame, and
4. means for reading from said second storage means and applying to said second output means during said selected time slots those signals stored in said second storage means during said first frame, and D. second control means for alternately directing 1. the simultaneous
   a. rectption of information from said second input means by said second storage means, and
   b. transmission of information to said second output means by said first storage means, and
2. subsequent to step (1) the simultaneous
   a. reception of information from said second input means by said first storage means, and
   b. transmission of information to said second output means by said second storage means.

2. In a time division multiplex communication system in which data are communicated in alternate even and odd time division multiplex signal frames, each of said frames having a plurality of ordered time slots, a bilateral crosspoint store for coupling first and second time division multiplex input lines to first and second time division multiplex output lines comprising:

A. first shared coupling means connected between said input lines and said output lines
for receiving signals present in selected one of said time slots of each even signal frame from said first input line, and
for transmitting the signals so received to said first output line in successive time slots beginning with an identified time slot of the next following odd signal frame, and for receiving signals present in successive time slots beginning with the starting time slot of each odd signal frame from said second input line, and for transmitting the signal so received to said second output line in selected ones of the time slots of the next following even signal frame, and B. second shared coupling means connected between said input lines and said output lines for receiving signals present in successive time slots beginning with an identified time slot of each odd signal frame from said second input line, and for transmitting the signals so received to said second output line in selected ones of time slots of the next following even signal frame.

3. Apparatus according to claim 2 further comprising a source of control signals designating an identified time slot in each of said signal frames and selected time slots in each of said signal frames, the reception and transmission of signals by said first and second means being responsive to said source of control signals.

4. Apparatus according to claim 3 further comprising means for supplying a control signal designating an identified terminator time slot in each of said signal frames upon the exhaustion of the signals being transmitted to said first output line.

5. A bilateral crosspoint store for providing time slot interchangeable coupling between a first input line and a first output line, and complementary time slot interchangeable coupling between a second input line and a second output line comprising:

timing means for establishing a plurality of time slots in alternate even and odd time division multiplex signal frames, a first control line for receiving signals designating selected ones of said time slots in each of said signal frames, a second control line for receiving signals indicating a starting time slot in each of said signal frames, a local control means for storing and transmitting said designating said indicating signals, a first reversible shift register, responsive to signals on said first and second control lines, said first shift register being uniquely associated with and interconnected between said first and second input lines and said first and second output lines for receiving signals present in selected ones of said time slots of each even signal frame, said selected time slots designated by signals on said first control line, from said first input line, and delivering the signals so received to said first output line in successive time slots beginning with the starting time slot of the next following odd signal frame, and receiving signals present in successive time slots beginning with the starting time slot of each odd signal frame from said second input line, and delivering the signals so received to said second output line in selected ones of the time slots of the next following even signal frame, said selected time slots designated by signals on said first control line, and a second reversible shift register, responsive to signals on said first and second control lines, said second shift register being uniquely associated with and interconnected between said first and second input lines and said first and second output lines for receiving signals present in selected ones of said time slots of each odd signal frame, said selected time slots designated by signals on said first control line, from said first input line, and delivering the signals so received to said first output line in successive time slots beginning with the starting time slot of the next following even signal frame, and receiving signals present in successive time slots beginning with the starting time slot of each even signal frame from said second input line, and delivering the signals so received to said second output line in selected ones of the time slots of the next following odd signal frame, said selected time slots designated by signals on said first control line.

6. The apparatus of claim 5 wherein said first and second reversible shift registers each comprise a plurality of stages and means for advancing signals stored in said stages stage-by-stage to the right and to the left, in alternate frames, said first shift register being adapted to receive signals from said first input line and to transmit signals to said second output line when advancing signals to the right, and to receive signals from said second input line and to transmit signals to said first output line when advancing signals to the left, and said second shift register being adapted to receive signals from said second input line and to transmit signals to said first output line when advancing signals to the right, and to receive signals from said first input line and to transmit signals to said second output line when advancing signals to the left.

7. A time division switching array for establishing spatial and temporal paths for binary signals through a matrix of *m* rows and *n* columns comprising:

*m* row input lines, where *m* is greater than 1;

*m* row output lines, each of which is associated with a particular one of said *m* row input lines;

*n* column input lines, where *n* is greater than 1;

*n* column output lines, each of which is associated with a particular one of said *n* column input lines;

a plurality of *mn* crosspoint storage devices, each of which is connected to one of said *m* row input lines and to the associated one of said *m* row output lines, and also to one of said *n* column input lines and to the associated one of said *n* column output lines, each of said crosspoint storage devices comprising a plurality of bit storage elements;

timing means for defining in a repetitive cycle a plurality of time slots for said binary signals; and unitary control means operative in each cycle to selectively direct said crosspoint storage devices to receive and store binary signals from said row and column input lines, to transmit binary signals received during the previous cycle from said row input lines to said column output lines, and to transmit binary signals received during the previous cycle from said column input lines to said row output lines, said plurality of bit storage devices in each of said crosspoint storage devices providing shared storage for binary signals received from both said row and column input lines.

8. A switching system for interconnecting a plurality of sets of lines in a communication system, wherein each of said sets comprise an input line and an output line, for the simultaneous transfer of information signals between said sets of lines comprising A. a crosspoint matrix for selectively interconnecting said sets of lines in pairs,
each crosspoint in said matrix comprising storage means for storing a plurality of said information signals, each of said storage means being permanently connected between one and only one uniquely associated pair of input lines and one and only one uniquely associated pair of output lines, and B. unitary control means for selectively enabling crosspoints in said matrix.

9. A switching system for interconnecting a plurality of sets of lines in a communication system, for the simultaneous transfer of information signals between said sets of lines each of said sets comprising an input line and an output line, said plurality of sets being divided into first and second groups of sets, said switching system comprising A. a crosspoint matrix for selectively interconnecting said sets of lines in pairs, each crosspoint in said matrix comprising storage means for storing a plurality of said information signals, said storage means being uniquely associated with a pair of input lines and a pair of output lines, said crosspoint matrix further comprising means for selectively providing time-delayable coupling at a crosspoint of
1. the input line of a designated set of said first group of sets to the output line of a designated set of said second group of sets, and
2. the input line of said designated set of said second group of sets to the output line of said designated set of said first group of sets, and B. unitary control means for selectively enabling crosspoints in said mstrix.

10. A switching system in accordance with claim 9 wherein said control means comprises A. memory means for storing a sequence of crosspoint location commands, B. means interconnecting said memory means and said crosspoint matrix for providing first control signals to crosspoints selected in accordance with said crosspoint location commands,
said selected crosspoints being responsive to said first control signals for receiving information from respective ones of said input lines of said second group of sets of lines and simultaneously transmitting information to respective ones of said output lines of said second group of sets, C. means interconnecting groups of crosspoints in said matrix for providing second control signals in sequence to crosspoints within each of said groups of crosspoints,
said crosspoints in said groups being responsive to said second control signals for receiving information from respective ones of said input lines of said first group of sets of lines and simultaneously transmitting information to respective ones of said output lines of said first group of sets.

11. In a time slot interchange system

A. first and second time division input and first and second time division output lines each capable of carrying time division signals arranged in a sequence of frames, each of said frames comprising an equal plurality of time slots, and B. a crosspoint store system comprising
1. control means for identifying selected time slots in each of said frames,
2. first and second memories for storing applied signals,
3. means for applying to said first memory signals appearing during said selected time slots in a first time division frame on said first input line,
4. means for applying to said second memory signals appearing during consecutive time slots of said first frame on said second input line,
5. means for reading from said first memory and applying to said first output line during consecutive time slots of a second frame those signals stored in said first memory during said first frame, and
6. means for reading from said second memory and applying to said second output line during said selected time slots those signals stored in said second memory during said first frame.

* * * * *